March 18, 1952  J. C. SIEGRIST  2,589,442
MOLD FOR PRODUCING SLIDING CLASP FASTENERS
Filed April 17, 1946  2 SHEETS—SHEET 1
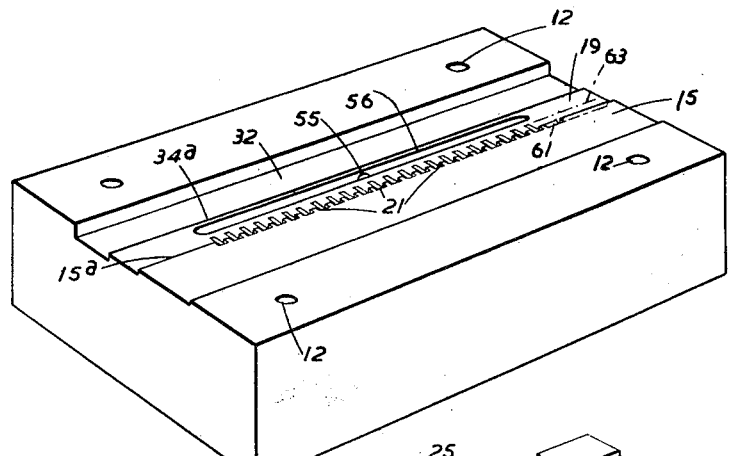
FIG. 1.
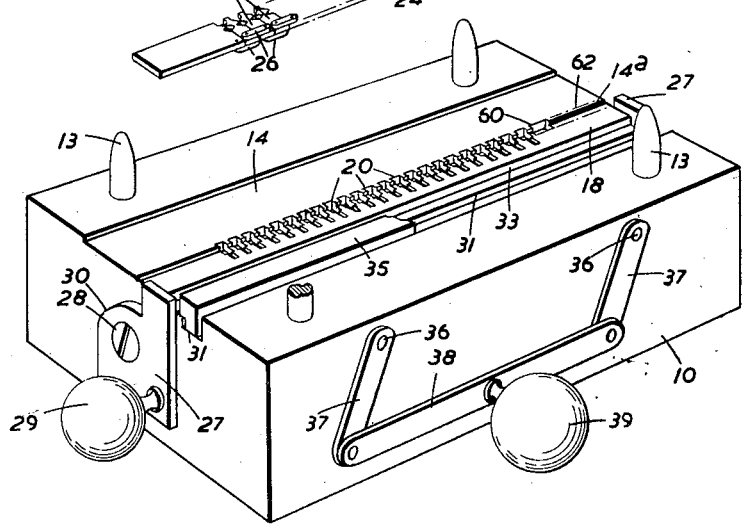
FIG. 2.
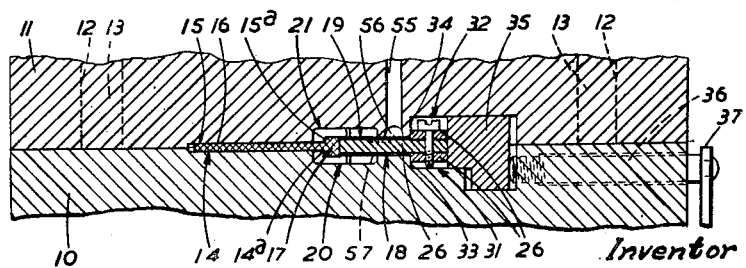
Inventor
JOHN CHRISTIAN SIEGRIST
By Haseltine, Lake & Co.
Attorneys

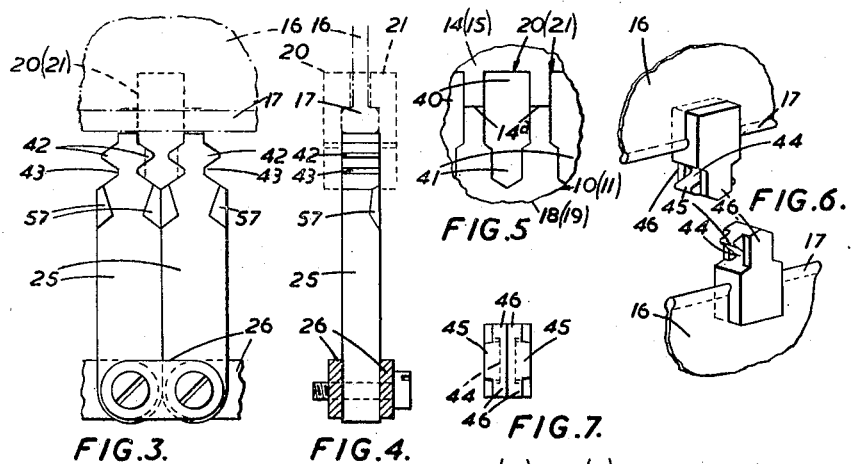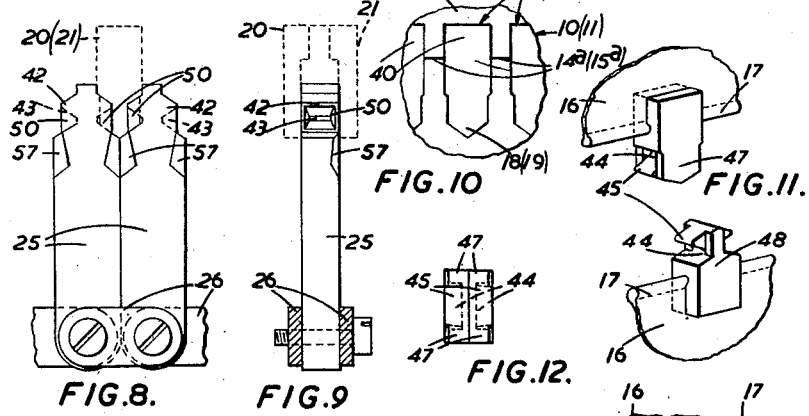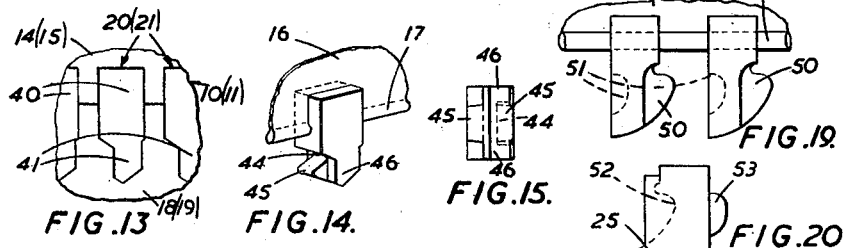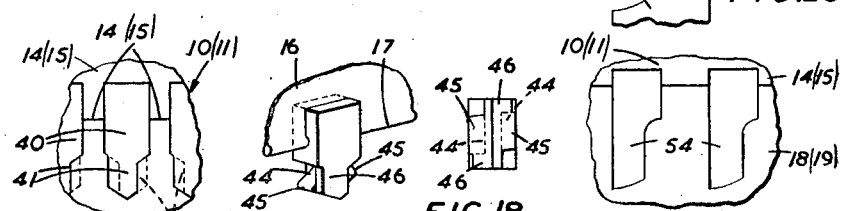

Patented Mar. 18, 1952

2,589,442

UNITED STATES PATENT OFFICE 2,589,442

MOLD FOR PRODUCING SLIDING CLASP FASTENERS

John Christian Siegrist, London, England

Application April 17, 1946, Serial No. 662,732
In Great Britain April 13, 1945

9 Claims. (Cl. 18—36)

This invention relates to the manufacture of sliding clasp fasteners of the kind in which the interlocking fastener elements are moulded either separately from or directly on to the carrier tapes or stringers.

In the manufacture of fasteners of this kind where the fastener elements are moulded directly on to and are thereby fixed to the carrier tapes, it has been known to employ a mould consisting of two interconnectable parts which may be separated for removal of the finished product. Such moulds, however, have the disadvantage that the shape or form of the fastener element produced thereby is extremely limited due to difficulty in making the complicated moulds which would otherwise be required. One kind of fastener element produced in this manner is disclosed in British patent specification No. 480,962, where each element is formed with transverse ridge-like projections and groove-like recesses, the latter being closed or covered only at one end with the result that, should the fastener be bent about an axis which is normal to the plane of the carrier tapes and with the open ends of the recesses outermost, pressure on the projections causes the latter to be forced out of the recesses.

Another disadvantage inherent in two-part moulds such as that referred to above is that, in view of the minute dimensions of the mould projections for forming the groove-like recesses or depressions in the fastener elements, such moulds are rendered entirely useless by damage to any one of the said projections, which is a very real possibility when removing a finished product from the mould.

It is an object of the invention to provide a mould for producing sliding clasp fasteners of the kind defined which enables the finished product to be removed therefrom without the risk of damage to the mould parts.

It is another object of the invention to provide a sliding clasp fastener mould in which those parts of the mould which produce the interengaging parts of the fastener elements are of such robust construction compared with the known moulds as to simplify and cheapen production of the mould, and, by providing for easy replacement of any such mould parts as may become damaged or worn, enable the mould to be used for long periods.

Still another object of the invention resides in the provision of a mould for producing in a single moulding operation not only sliding clasp fasteners of known form but also of improved form in which the possibility of lateral disengagement of the fastener elements due to bending of the fastener is effectively prevented.

According to the invention, a mould of the kind referred to comprises two co-operating mould members or parts and a separable core or cores for forming the interengaging parts of the fastener elements. In this way the core or cores may be removed from the mould with the finished product and then disengaged from said product by flexing or deforming the carrier tape in the same way as when the fastener elements are disengaged from one another during normal use.

Preferably a plurality of identical core members are provided, said members being of substantially the same thickness as that edge portion of the tape to which the fastener elements are to be attached. Preferably also the several cores are pivotally connected one to another in order to simplify their insertion in the mould and to facilitate their disengagement from the finished product.

A mould according to the present invention is also eminently suitable for producing a fastener element adapted to prevent the possibility of the fastener becoming opened if it should become bent in such manner that the elements tend to space more widely at one end than the other.

For the purpose of this description of the invention, the sides of the fastener elements are understood to be those faces which lie transversely of the carrier tapes, while the ends of said elements are those faces which lie parallel to the carrier tapes.

In order that the invention may be clearly understood and readily carried into effect, the same will hereinafter be more fully described with reference to the accompanying drawings, in which:

Figure 1 is an exploded perspective view of the mould, the upper mould member being shown inverted;

Figure 2 is a transverse sectional view of the mould shown in Figure 1;

Figures 3 to 7 inclusive are detail views relating to the production of a moulded sliding clasp fastener element of which the depressions in both sides thereof are partially covered at both ends, Figure 3 being a plan view of two adjacent core members, Figure 4 a side view of Figure 3, Figure 5 a plan view of one of the mould members, Figure 6 a perspective view showing two co-operating fastener elements disengaged from one another, and Figure 7 being a plan view of one of said elements;

Figures 8 to 12 inclusive are similar detail views to Figures 3 to 7 relating to the production of a modified moulded sliding clasp fastener element of which the depressions in both sides thereof are substantially fully covered at both ends, the core members also being modified;

Figures 13 to 15 inclusive are detail views relating to the production of a further embodiment of moulded fastener element of which the depression at one side is fully covered while that at the other side is fully uncovered, Figure 13 being a plan view of one of the mould members, Figure 14 a perspective view of the fastener element and Figure 15 a plan view of said element;

Figures 16 to 18 inclusive which are similar views to Figures 13 to 15, relate to the production of a moulded fastener element of which the depression at one side is fully covered at one end and fully open at the other, the cover for the depression in the other side being reversed; and Figures 19 to 21 inclusive are detail views relating to the production of a moulded fastener element similar to the known metal element, Figure 19 being a detail end view showing two adjacent elements on the same tape, Figure 20 a side view of a portion of a core member, and Figure 21 a plan view of a portion of one of the mould members.

Referring now to the drawings and firstly to Figures 1 and 2 thereof, the mould comprises a base member 10 and an upper removable member 11 (shown inverted in Figure 1) adapted to be accurately positioned on the base member as by means of holes 12 registerable with upstanding pins 13 on said latter member. The base member 10 has extending longitudinally thereof a plane surface portion 14 which is stepped slightly below the level of the upper face of said member and, in the assembled position of the mould, registers with an oppositely stepped plane surface 15 in the upper mould member 11 to form a shallow open-ended chamber for the reception of a carrier tape 16 (Figure 2). This tape is here shown as having a beaded or thickened edge 17 which is adapted to overhang the surfaces 14, 15, being accommodated within a chamber formed by other oppositely stepped plane surfaces 18, 19 provided in the lower and upper moulds respectively and extending longitudinally thereof adjacent the surfaces 14 and 15.

Formed in the co-operating faces of the mould members 10, 11 are a plurality of recesses or depressions 20, 21 respectively which, as shown, are mainly cut in the surfaces 18, 19 but extend therefrom a short distance into the adjacent edge portions of the surfaces 14, 15. It will thus be understood that the beaded edge of the carrier tape crosses the depressions 20, 21 at zones intermediate their ends, thereby enabling the moulding material admitted, as will later be described, to said depressions to encircle the tape bead.

The chamber formed between the surfaces 18 and 19 of the mould members also accommodates, in the operation of the mould, a core 24 comprising a plurality of metal strips 25 which are shaped at the ends adjacent the mould depressions so as to produce in the moulding material the desired contours to form the interengaging depressions and recesses in the fastener elements, and at the opposite ends are, as shown, conveniently pivotally connected one to another by means of links 26. The core is adapted to be accurately and releasably positioned longitudinally of the mould by means of end plates 27 arranged to abut the outer ends of the core, at least one of said end plates being movable into and out of engagement with the core. As here embodied, one plate 27 is pivotally mounted at 28 on the lower mould member 10 and is provided with a handle 29 by which it may be swung to and from the operative position illustrated. Means (not shown), such as a spring-loaded ball housed in the adjacent end of the mould member 10 and co-operable with a recess in the inner face of the plate 27, may be provided to locate and maintain said plate in the operative position. Both end plates 27 are so formed as to provide clearance for the beaded edge of the carrier tape when the latter extends beyond the ends of the mould and the movable plate is also shaped as at 30 to clear the tape while it is being swung between the upper operative position and lower inoperative positions.

Provision is also made for accurately and releasably positioning the core laterally of the mould and to this end the surfaces 18 and 19 are followed by further oppositely stepped surfaces 31, 32 respectively which combine to form a chamber for receiving the core links 26. In operation, the core links are pressed against the steps 33 and 34 separating the respective mould surfaces 18, 31 and 19, 32 and for this purpose the chamber formed between the surfaces 31 and 32 accommodates a longitudinally extending bar 35 with which a plurality of bolts 36 threaded into the mould member 10 are arranged to engage. The bolts 36 are shown in Figure 1 as having secured thereto arms 37 which are pivotally connected together by a link 38 carrying a handle 39, this arrangement providing for quick clamping and release of the core. In this position of the links the core members 25 are pressed against the beaded edge of the tape to compress the latter between the lower and upper mould surfaces 18, 19 and so prevent leakage of the moulding material along those parts of the bead lying intermediate the mould recesses 20, 21.

The use of a removable core for forming the projections and recesses in the moulded fastener elements enables the contour or form of said elements to be widely varied and, in addition to fastener elements of known form, provides for the manufacture of moulded fasteners having improved locking characteristics as compared with existing kinds. Various kinds of fastener elements, together with the cores and moulds used in their production, will now be described in detail with reference to Figures 3 to 21 of the drawings.

Referring to Figures 3 to 7 inclusive, there are shown two adjacent core members 25 (Figures 3 and 4) and a portion of one of a pair of mould members for moulding directly on to a carrier tape 16 fastener elements of the kind shown in Figure 6. The main or body portions of the fastener elements are moulded on the beaded edge portion 17 of the carrier tape 16 by the upper larger parts 40 (Figure 5) of the recesses 20 and 21 in the base and top mould members, and the outer or interengaging portions of the fastener elements are moulded by the lower smaller parts 41 of said recesses. The mould recesses 21 are exactly superposed over the mould recesses 20 and, by reference to Figure 3, it will be clear that the core members are positioned longitudinally of the mould so as to lie between consecutive mould recesses.

The ends of the core members 25 remote from the connecting links 26 are shaped to produce the required contour at the interengaging ends of the fastener elements. As here shown, each core member is formed at its free end and at each side thereof with an outwardly tapered projection 42 followed by an inwardly tapered recess 43, said projections 42 forming groove-like recesses 44, and said recesses 43 forming ridge-like projections 45, in opposite sides of the fastener elements. The thickness of the core members 25 (see Figure 4), which is substantially equal to that of the beaded edge of the carrier tape, is less than the combined depth of the mould recesses 20 and 21 with the result that the recesses 44 and projections 45 on the fastener elements terminate short of the ends of said elements.

In order, when in use, to prevent relative movement of the fastener elements in a direction normal to the plane of the carrier tape and also to avoid the possibility of disengagement of said elements should the fastener become bent about an axis which also lies normal to said plane, the ends of certain or all of the recesses formed in said elements by the core projections 42 are substantially wholly or partially closed or covered by a web formed in the moulding operation by the mould recess portions 41. In the arrangement shown in Figures 3 to 7, the width of the mould recess portions 41 and the centrally aligned location of said recess portions relative to the corresponding recess portions 40 produce end webs or covers 46 which close the opposite ends of both recesses 44 in each fastener element, see Figures 6 and 7, to a depth of approximately half that of said recesses 44. This enables complementary fasteners to comprise fastener elements both produced by the mould and core illustrated in Figures 3 to 5.

In the arrangements shown in Figures 8 to 12 inclusive, the width of each portion 41 of the mould recesses 20 and 21 and the central alignment thereof with the corresponding recess portions 40 produce end webs or covers 47 (shown in the upper fastener element of Figure 11 and also in Figure 12) which close the opposite ends of both fastener element recesses 44 to a depth very nearly equal to that of said recesses 44. With a fastener element of this form, the complementary elements 48 on the other carrier tape are formed without a covering or closing web at either end thereof. The elements 48 may be formed either in a mould containing a core 24 or in a mould (not shown) in which the recesses 20 and 21 conform to the shape of said elements and without using a core.

Figures 13 to 15 inclusive illustrate the production of another form of fastener element having the same lateral locking characteristics as those described above. As shown in Figure 13, the portions 41 of the mould recesses 20 and 21 are both offset in the same direction in relation to the mould recess portions 40, this arrangement producing elements of which the recess 44 in one side face is substantially completely covered at both ends thereof, while the recess in the other side face is completely uncovered at both ends. The fastener elements on both carrier tapes are, apart from being reversed, identical and are produced by the same mould and core.

In the arrangement shown in Figures 16 to 18 inclusive, the portion 41 of each mould recess is such as to produce substantially complete cover for one fastener element recess 44 at one end thereof and to leave the same end of the other recess completely uncovered. The mould recess portions 41 of the upper mould, illustrated in broken lines in Figure 16, are offset in relation to the mould recess portions 40 in the opposite direction to the portions 41 of the lower mould, shown here in full lines. Thus the two recesses in each fastener element are substantially completely covered at diagonally opposite ends and completely uncovered at the other diagonally opposite ends. This arrangement requires the provision of two moulds to produce the complementary fastener elements, the same core being used in each mould.

In the formation of the fastener elements described in detail above, the projections 45 thereon are of constant width from the crest to the base thereof and, furthermore, are of the same width as the recesses 44. To facilitate engagement and disengagement of the complementary fastener elements the projections thereon may be of a width slightly less than that of the recesses and, in addition, they may have outwardly tapered or converging end faces. This form of projection can be produced during the moulding operation by closing one or both ends of the core member recesses 43, as shown by way of example in Figures 8 and 9, by means of thin webs 50 the inner faces of which are inwardly converged as illustrated in Figure 9. Figures 7, 12, 15 and 18 all show the tapered form of projection. In Figure 18 only that end of each projection is tapered which corresponds to the closed end of the complementary fastener element, this being effected by omitting one of the webs 50 of each core member 25. Either kind of core member may be employed in the production of the several fastener elements described above except for the fully uncovered element shown in Figure 11, where a core, if used, is of the kind shown in Figure 4.

Figures 19 to 21 inclusive relate to the production of a moulded sliding clasp fastener of a form generally similar to that of the metal fasteners now in general use. A pair of such fastener elements each having a projection 50 one side face thereof and a depression 51 in the other side face are shown in Figure 19. The core member 25 shown in Figure 20 has a recess 52 therein for forming the projection 50 and a protuberance 53 on its opposite face for forming the depression 51. Figure 21 shows the recesses 54 in one of the mould members. With this form of fastener element the core members (Figure 20) may be shaped so as to form the entire outermost or intermeshing parts of the elements without any impression in the mould or, as in the other embodiments, may be made to form only the recesses 52 and projections 53, the end parts of the elements being formed by mould recesses 54.

In the employment of the mould according to the invention for producing sliding clasp fasteners in which the elements thereof are moulded directly on to the carrier tapes, a tape is placed on the stepped surface 14 of the base mould member 10 with an edge (the beaded edge if provided) overlying the adjacent portion of the stepped surface 18 and the recesses 20. The core is then placed on the surface 18, the pivoted end plate 27 (or each plate if so mounted) swung upwardly about its pivot to locate the core accurately on the mould longitudinally thereof and the upper mould member 11 then placed on the base mould member and clamped down. The bolts 36 are then turned by actuation of the handle 39 to move the bar 35 laterally into engagement with the core and in turn secure the core links 26 between said bar and the step 33, the tape bead being thereby compressed against the surfaces 18, 19 and the adjacent steps 14a, 15a. The mould is then ready to receive the moulding material.

The moulding material is run into the mould through an opening (not shown) in the top face of the upper mould member, passes downwardly through a conduit 55 (Figure 2) to the bottom face of the upper mould member, whence it passes along a trough or channel 56 (see also Figure 1) in said bottom face. Communicating with the channel 56 are a plurality of notches 57 (see also Figures 3, 4, 8 and 9) formed in the upper faces of the core members 25 and, as shown in Figures 3 and 8, these notches also communicate with the mould recesses 20 and 21, which thus become filled with the moulding material. When this filling operation has been completed, and the material has set, the upper mould member is unclamped and removed. This leaves the carrier tape edge portion and the free ends of the core members 25, including the projections 42 and recesses 43 thereof, embedded in the moulding material, the latter also having superfluous portions corresponding to the channel 56 and conduit 55. These superfluous portions are broken away, the edges of the recesses 43 in the core members adjacent the notches 57 enabling this to be done cleanly, and the core is then removed by rocking consecutive core members about their pivots and deforming the carrier tape in the same way as during the normal unlocking movement of the fastener when in use. The flexible nature of the core enables this latter operation to be carried out without damage either to the moulded fastener elements or to the core.

At one end of each row of recesses 20, 21 in the mould members there is provided a larger recess 60, 61 respectively for forming the stop normally provided at the top end of the fastener, these recesses communicating with one another and with the conduit 56.

If the required length of a fastener should exceed that of the mould, the recesses 20, 21 at one end may be extended to the adjacent ends of the mould members, as indicated in chain lines at 62, 63 in Figure 1. This requires the use of two separate moulds, one of which embodies the mould recesses 62, 63 and the other the mould recesses 60, 61. The latter mould is used to produce the first length of the fastener and the end stop, the other mould being used for the remaining stages. For each additional length the last formed element is located at the inner end of the chamber formed by the recesses 62, 63, which recesses are out of communication with the channel 56.

Although it may usually be preferred, as in the examples described above, to mould the fastener elements directly on to the carrier tapes, these elements may, if desired, be moulded independently of the tapes and subsequently attached thereto as by an adhesive. In this case the carrier tape is replaced by a core of strip form which, in the same manner as the tape, is accommodated between the surfaces 14, 15 of the mould members and partially overlies the adjacent mould surfaces 18, 19. This mould thus forms slits in the base ends of the fastener elements within which the tapes are adapted to be threaded.

It is to be understood that in certain respects the mould described herein with reference to Figures 1 and 2 of the drawings is purely exemplary and such features as the locating of the upper mould member on the base mould member, the means for longitudinally positioning the core, and the means for transversely locking the core are capable of modification within the scope of the invention as set forth in the appended claims.

I claim:

1. A mould for producing sliding clasp fasteners and casting the fasteners directly onto a carrier tape, comprising a pair of rigid mould members constructed to accommodate said tape, a plurality of moulding depressions formed in the cooperating surfaces of the mould members, said depressions constituting, when the mould members are superimposed one upon the other, a series of aligned composite mould cavities, a separable core comprising a plurality of relatively movable core members each having shaped moulding portions at one end and means at the other end for connecting the respective core members one to another, means for accommodating said core within the superposed mould members with the shaped portions of the core members extending into the composite mould cavities and the remaining portions of said core members disposed side-by-side in abutting relation, and means for independently adjusting the core longitudinally and laterally of the mould members so as to press the ends of the core members against the edge of the carrier tape and to position said core members with respect to the mould cavities, for the moulding of the fastener elements.

2. A mould for casting sliding clasp fasteners comprising a pair of rigid mould members the co-operating faces of which are formed with a plurality of spaced moulding depressions, longitudinally extending channels in said co-operating faces, said channels forming between said mould members a chamber for the reception of a carrier tape, a separable core comprising a plurality of relatively movable core members each having shaped moulding portions at one end and means at the other end for connecting the respective core members one to another, means for accommodating said core within the mould members with the shaped portions of the core members extending into the moulding depressions and the remaining portions thereof disposed side-by-side in abutting relation, means for adjusting the core longitudinally of the mould members to bring the shaped portions of each pair of adjacent core members into overlapping relation with the composite moulding depression disposed between said pair of core members, for the formation of the interengaging parts of each fastener element, and means for adjusting the core laterally of the mould members and pressing the end faces of the shaped portions of the core members against the edge of the carrier tape.

3. A mould for casting sliding clasp fasteners, comprising a pair of rigid mould members, the co-operating faces of which are formed with a plurality of spaced depressions which constitute, when the mould members are superimposed one upon the other, a series of aligned composite moulding cavities, stepped portions on said co-operating faces, said stepped portions forming longitudinally extending channels between the superimposed mould members, a separable core comprising a plurality of relatively movable core members each having shaped moulding portions at one end and means at the other end for connecting the core members together, said core being engageable in said channels with the shaped moulding portions of the core members extending into the moulding cavities and the side faces of the remaining portions of said core members in abutting relation, and means for adjustably sliding the core longitudinally and laterally of the mould to bring the said core members into the required position relatively to the mould cavities.

4. A mould for producing a series of sliding clasp fasteners moulded directly onto the beaded edge of a carrier tape, comprising two rigid mould members the co-operating faces of which are formed with a plurality of aligned moulding depressions and longitudinally extending recessed surfaces which provide a step extending across said moulding depressions intermediate the ends thereof, said recessed surfaces forming, when the mould members are superposed one upon the other, longitudinal channels on either side of said step, in one of which channels the carrier tape can be accommodated, with the beaded edge of said tape overlying said step, a separable core comprising a series of substantially flat relatively movable members, each of the core members having shaped moulding portions at one end, and means at the other end for the connection of the respective core members one to another, the flat core members when placed within the mould members forming a substantially continuous strip and the shaped moulding portions of said core members extending into the moulding depressions and co-operating therewith in the formation of the fastener elements, while the remaining portions of said core members are disposed side-by-side in abutting relation, means for adjusting the core laterally of the mould members to press the end faces of the shaped portions of the core members against the beaded edge of the carrier tape thereby to urge said beaded edge against the step and prevent leakage of moulding material.

5. A mould as claimed in claim 4, wherein each core member is formed on either side with a tapered notch leading into the shaped moulding portions of said member, the notches of adjacent core members forming channels communicating with the moulding depressions, and wherein one of the mould members is formed with a longitudinal channel communicating with each of said notches for admitting moulding material to said depressions, said tapered notches providing edges about which superfluous portions of moulded material are broken away after the moulded fastener elements have been removed from the mould.

6. A mould for producing and casting sliding clasp fastener elements directly onto a carrier tape, comprising in combination a rigid two-part mould and a removable core, said core having a plurality of relatively movable core members, means for accommodating said carrier tape and said core within the mould parts with portions of said core members arranged in abutting relation to form a substantially continuous strip, a longitudinally extending bar adapted to be located between said mould parts and engageable with said core members, means releasably engageable with said bar for adjusting the core laterally of the mould and pressing the core members against the carrier tape, said core being removable after the moulding operation with the moulded fastener elements attached thereto, the relatively movable core members permitting said fastener elements to be stripped from said core members.

7. A mould as claimed in claim 6, wherein the core members are formed with shaped moulding portions at one end thereof for the formation of the interengaging parts of the fastener elements, said shaped portions being symmetrical in form and provided on either side with a projection and a recess.

8. A mould as claimed in claim 7, wherein the shaped moulding portions of the core members are formed with webs adjacent said projections and recesses.

9. A mould for producing sliding clasp fasteners comprising a pair of rigid mould members formed in their adjacent faces with a plurality of aligned moulding depressions, a separable core comprising a plurality of relatively movable members and link means for pivotally connecting said core members one to another, means for accommodating said core within the mould members with portions of the core members disposed in abutting relation, each of said core members having shaped moulding portions comprising a projection extending laterally from one side of the core member and a recess formed in the opposite side thereof, and means for adjustably positioning the core within the mould members, so that the shaped portions of said core members are properly located with respect to the moulding depressions for the formation of the fastener elements.

JOHN CHRISTIAN SIEGRIST.

REFERENCES CITED

The following references are of record in the file of this patent:

UNITED STATES PATENTS

| Number | Name | Date |
|---|---|---|
| 2,133,019 | Campbell | Oct. 11, 1938 |
| 2,200,634 | O'Koomian | May 14, 1940 |
| 2,351,582 | Bohrer | June 20, 1944 |
| 2,360,011 | Popp | Oct. 10, 1944 |
| 2,374,292 | Kuna | Apr. 24, 1945 |
| 2,385,020 | Morin | Sept. 18, 1945 |
| 2,074,368 | Corner | Mar. 23, 1937 |
| 2,403,739 | Morin | July 9, 1946 |
| 2,415,395 | Ulrich | Feb. 4, 1947 |

FOREIGN PATENTS

| Number | Country | Date |
|---|---|---|
| 554,415 | Germany | July 8, 1932 |

OTHER REFERENCES

Modern Plastics, "Improved Design For Injection Molds," May, 1941—pgs. 77 and 102.